Dec. 26, 1967          H. BAUMLER          3,359,617

METHOD OF MAKING AN ANNULAR SPRING

Filed May 13, 1965

Inventor
Hermann BÄUMLER

By *Melvin H. Crosby*

United States Patent Office 3,359,617
Patented Dec. 26, 1967

3,359,617
METHOD OF MAKING AN ANNULAR SPRING
Hermann Baumler, Burscheid, Cologne, Germany, assignor to Goetzewerke Friedrich Goetze Aktiengesellschaft, Dusseldorf, Germany
Filed May 13, 1965, Ser. No. 455,390
3 Claims. (Cl. 29—173)

ABSTRACT OF THE DISCLOSURE

A method of making an annular spring in which a length of coil spring is stressed to a degree equivalent to the stress the annular spring will be subjected to in use, and the stressed spring is cut to the length the annular spring will have when stressed in use, and the cut ends of the length of spring are then joined together.

---

This invention relates to spring rings of the tensile and compressive type which are used in connection with elastic sealing means and the method of making such rings.

In a typical application, a tensile spring ring is used in connection with a resilient or elastic sealing means which has a lip portion in sealing engagement with a rotating shaft. The tensile spring ring is positioned around the lip portion of the sealing means and urges the lip portion into sealing engagement with the rotating shaft. Under ideal conditions the pressure exerted on the lip portion by the tensile ring should be such as the provide the necessary sealing engagement and yet not cause excessive wear on the lip portion of the sealing means.

The compressive type spring ring is used similarly except the compressive spring ring urges the lip portion of the sealing means outwardly against the parts of the machine or apparatus to be sealed off.

The radial pressure that is exerted by the prior art spring rings of the tensile or compressive type is difficult to control and is subject to considerable variation due to variations in the production of the rings. The wrong radial pressure on the sealing means at one extreme causes excessive wear on the lip portion of the sealing means and at the other extreme, the wrong pressure causes improper sealing. For example, if the spring ring is so strong as to eliminate all possibility of leakage, the friction resulting from such excessive strength in the spring causes a resulting deterioration of the lip portion of the sealing means.

When making a spring ring according to this invention, the closest possible tolerances are maintained. The close tolerances are maintained on the wire diameter used to form a length of spirally wound spring coil, on the diameter of the coil so formed, and on the tensioning of the wire while the coil is so formed.

When making a tensile spring ring, for example, a length of the coil so wound is then subjected to a tensile axial load, and while the coil is so stretched, it is cut to a predetermined length which is equal to the circumferential length which the spring ring will assume when in use on the pertaining portion of the sealing means.

The axial load which is placed on the length of the coil prior to cutting is equivalent to the stress or load which the spring ring will exert on sealing means when in use thereon. By this method, sealing rings are produced which will exert as stress on the pertaining sealing means which stress will be kept within extremely close limits.

Accordingly, an object of this invention is to produce spring rings of the tensile and compressive variety which are produced within close limits and which produce a constant stress on the sealing means with which they are used.

Another object of this invention is to produce spring rings of the above type which are economical to manufacture and which are used with sealing means to produce a sealing ability in the sealing means which can be controlled within close limits.

Another object of this invention is to provide a method for producing spring rings of the tensile and compressive type mentioned above.

Accordingly, these and other objects and advantages will become more apparent upon reading the following specification and drawings, in which.

Figure 1:
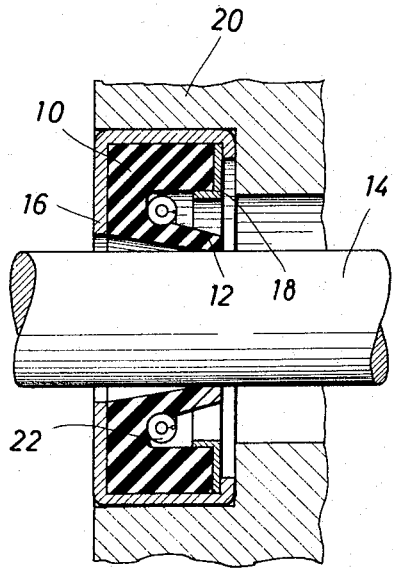
FIGURE 1 is a general cross sectional view of one embodiment of the invention showing a typical use.

Referring to the drawings in mole detail, FIGURE 1 shows a cross sectional view of the sealing means 10 which has a lip portion 12 in sealing engagement with a rotating shaft 14. The resilient or elastic sealing means 10 is secured in metal retainers 16 and 18, and which member 16 is positioned in a recess of frame member 20 as shown. A tensile spring ring 22 is shown in position on the lip portion 12. In this position, the spring ring urges the lip portion 12 into sealing engagement with the shaft 14. The pressure exerted on the lip portion 12 should be such as to provide the require sealing between the lip portion of the shaft and be not so great as to cause excessive wear on the lip portion 12.

Figure 2:
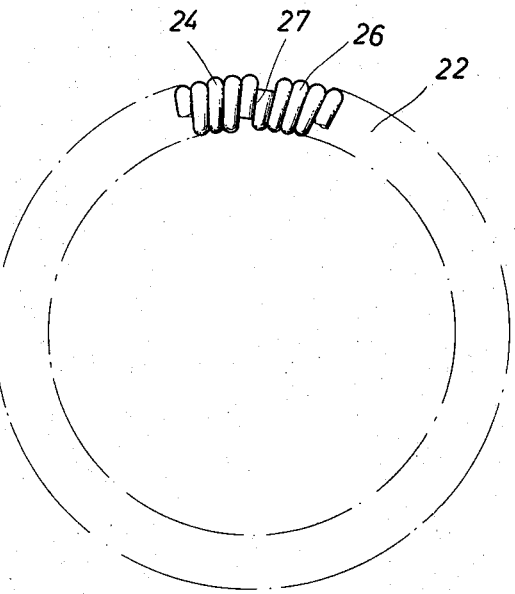
FIGURE 2 is a plan view of a spring ring of the tensile variety.

FIGURE 2 shows the tensile spring ring of this invention which has ends 24 and 26 suitably joined at 27 by known techniques such as soldering, welding and the like.

Figure 3:
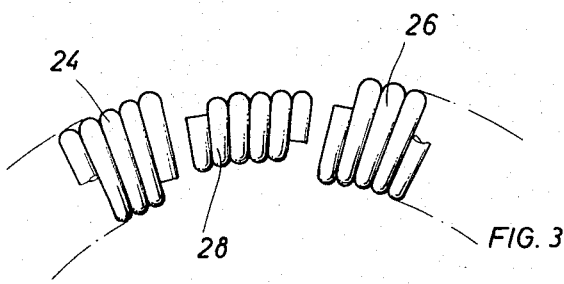
FIGURE 3 is a plan view of the portion of the section shown in FIGURE 2, and further showing how the ends of the ring may be joined.

FIGURE 3 shows a common method for joining ends 24 and 26 and consists of a smaller spring member 28 which may be inserted in the open ends 24 and 26 of the spirally wound coil. After the ends are brought into abutting engagement they may be soldered as previously.

Figure 4:
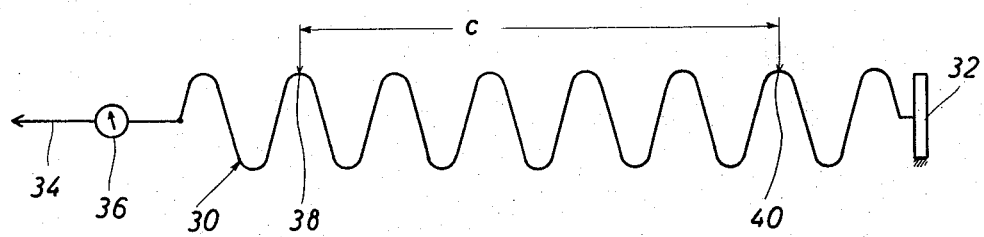
FIGURE 4 is a schematic diagram showing the method of cutting a tensile spring ring to the appropriate length.

FIGURE 4 shows in schematic form the method of determining the length of spirally wound wire which is cut for the particular application with a sealing means. In this method, a length of spirally wound wire formed into a coil and generally designated 30 has one end thereof secured to a stationary member 32 and the other end of the member 32 is subjected to an axial load in the direction of arrow 34. A suitable indicating gage 36 is used to indicate the desired load required. The load on the length of the coiled wire is equivalent to the load which the spring ring will exert on the sealing means when the ring is positioned in use on the pertaining resilient sealing means.

While the length of wire is subjected to this axial load, a length of this coil such as length C is obtained by cutting the length of coil 30 at points 38 and 40. The length C is equivalent in length to the circumferential length which the spring ring will assume when it is in position in use on the pertaining resilient sealing means.

After the length C is cut, it will return to its non-tensioned length and the ends thereof can be secured together as previously explained.

By this method, minor variations which are caused by differences in wire diameter, pre-tensioning of the coil during winding and the like or alleviated when the length C of the coil spring is so determined. The individual lengths C of the lengths of coil spring so cut may vary somewhat. However, when these individual lengths C are formed into the rings as shown in FIGURE 2 and are positioned on the pertaining sealing means, the rings so formed will produce a force on the resilient sealing means which is held within close limits.

While the different embodiments in the drawings have been explained in relation to a spring ring of the tensile variety, the spring rings of the compressive type can be made according to the techniques here explained. In FIGURE 4, for example, the force used when making a compressive type spring ring would also be an axial force; however, it would be directed in a direction opposite that of arrow 34 to thereby compress the length of coil when placed under the predetermined load. While so stressed, the coil would be cut to a length which is equal to the circumferential length which the resulting spring ring will have in position on the sealing means.

The spring rings according to this invention may be used in conjunction with sealing rings for sealing off rotating shafts, cuffs, oil stripping piston rings, etc.

It will be understood that this invention is susceptible to modification in order to adapt it to different usages and conditions; and accordingly, it is desired to comprehend such modifications within this invention as may fall within the scope of the appended claims.

What is claimed is:
1. The method of producing a spring ring comprising the steps of: stressing a length of spirally wound wire in an axial direction with a predetermined stress which is equivalent to the stress which the ring has when positioned in use, cutting said length of wire when stressed in an axial direction to a predetermined length which is equal to the circumferential length which the spring ring will have when in use, and joining the ends of said length of wire which is cut to form said ring.
2. The method as claimed in claim 1 in which said steps of stressing said length of spirally wound wire is a tensioning step.
3. The method as claimed in claim 1 in which said step of stressing said length of spirally wound wire is a compressing step.

References Cited
UNITED STATES PATENTS

| | | | |
|---|---|---|---|
| 678,672 | 7/1901 | Lindenthal | 29—404 |
| 2,860,869 | 11/1958 | Utvitch | 29—173 X |
| 3,108,370 | 10/1963 | Peichi et al. | 29—404 X |
| 3,189,986 | 6/1965 | Mayfield | 29—404 |

THOMAS H. EAGER, *Primary Examiner.*